C. H. HAPGOOD.
WEIGHING SCALE.
APPLICATION FILED JULY 25, 1912.
1,188,069.
Patented June 20, 1916.
3 SHEETS—SHEET 3.
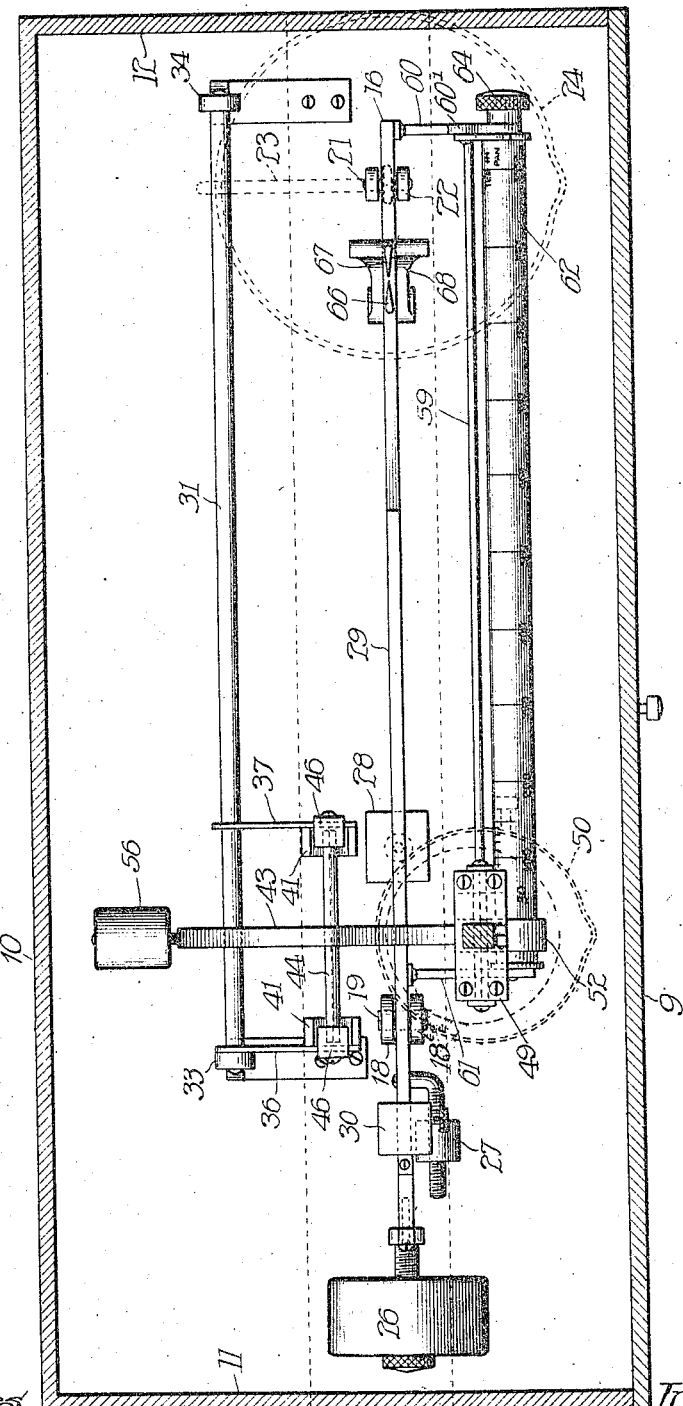

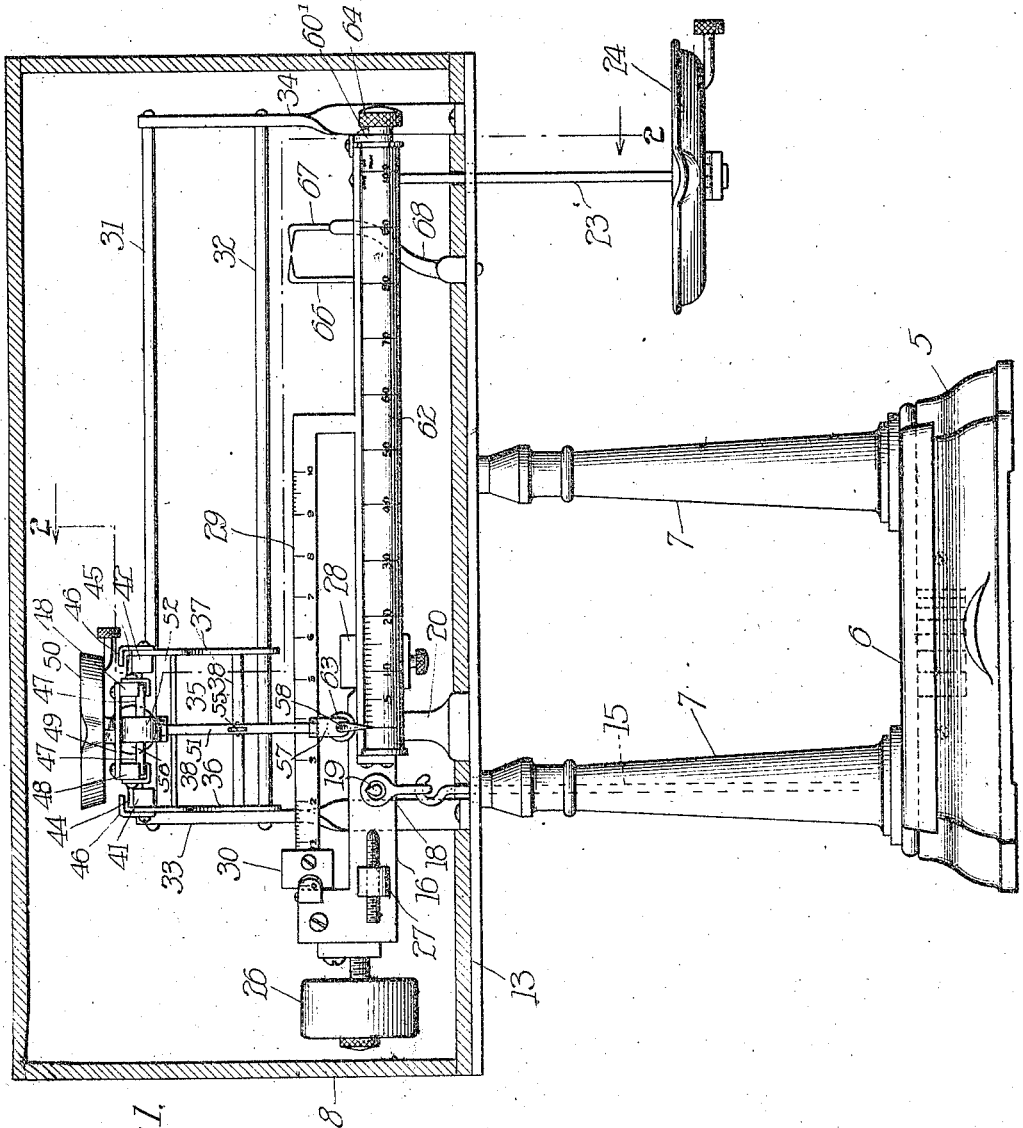

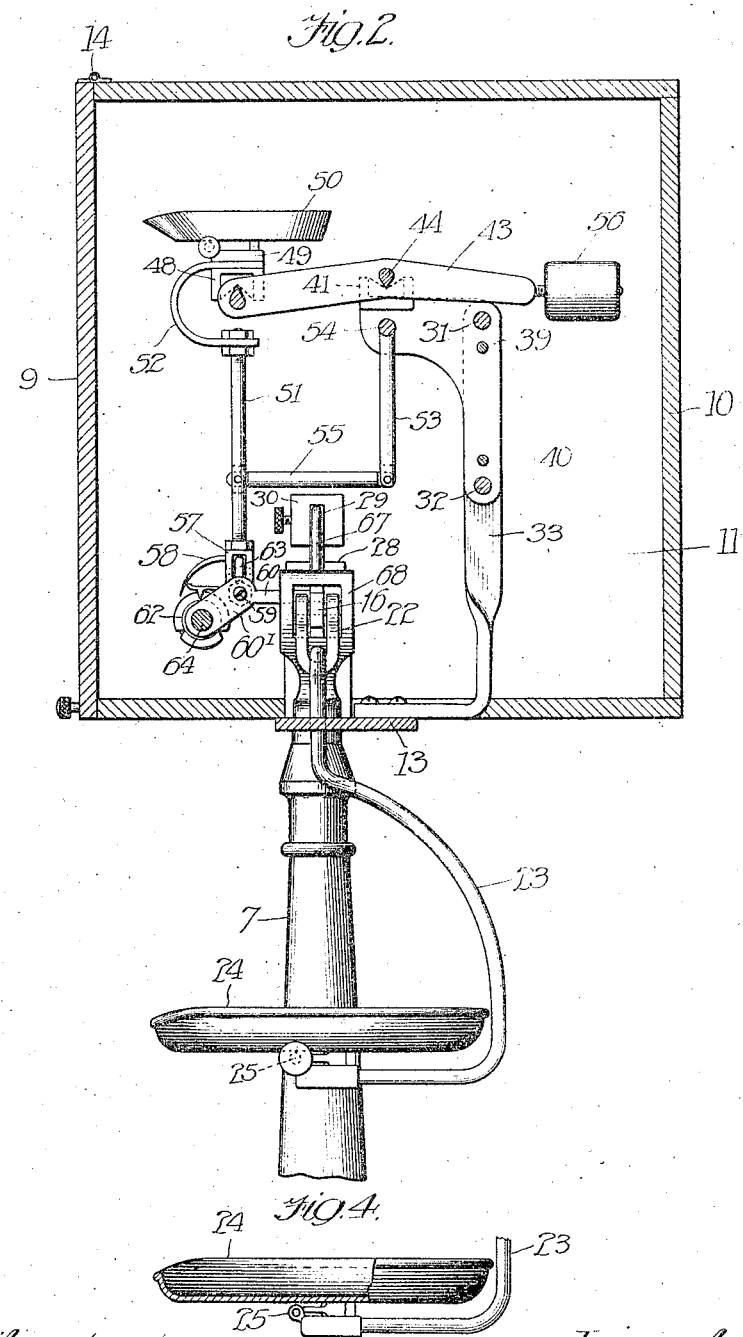

UNITED STATES PATENT OFFICE.

CLARENCE H. HAPGOOD, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,188,069.  Specification of Letters Patent.  Patented June 20, 1916.

Application filed July 25, 1912.  Serial No. 711,506.

*To all whom it may concern:*

Be it known that I, CLARENCE H. HAPGOOD, a citizen of the United States, residing at Toledo, in the county of Lucas and State of Ohio, have invented certain new and useful Improvements in Weighing-Scales, of which the following is a specification.

My invention relates more particularly to a scale designed and adapted to determine the number of units or identical small articles in a group or mass without the labor of counting the same, and also for telling off any definite desired number of such articles by a single weighing operation. As examples of the use of my invention it is pointed out that customers in hardware or similar stores frequently desire to purchase a definite number of screws or other small articles, depending on the particular work in view, rather than a definite weight of the same, and again, in factories, shops, etc., it is of advantage to be able to dispense from the stock-room the number of small parts required for a certain piece of work or job. The counting of such parts is substantially prohibited by reason of the time consumed especially where the parts are very small, and quantities of stock are taken in excess of those demanded by the work, with the result that considerable material is wasted. Moreover, in taking stock and preserving the necessary number of parts on hand it is desirable to have a quick means or method for accurately determining the number of such parts. My invention provides a means for quickly and accurately determining the number of such articles or units in any mass or group, and telling off any desired number by a single weighing operation, thus preventing the waste of material referred to above and at the same time avoiding the loss of time required to count the articles.

In the accompanying drawings I have shown a preferred embodiment of my invention and in the following specification have described the same in detail, but it is to be understood that though the embodiment described is my preferred form the disclosure thereof is for the purpose of exemplification only and that my invention is not limited thereto but is defined in the following claims.

Referring now to the drawings, Figure 1 is a front elevation of a scale embodying my invention, a casing inclosing certain of the operative parts, however, being shown in section; Fig. 2 is a fragmentary vertical section upon the line 2—2 of Fig. 1 upon a plane at right angles to the plane of said figure and upon a somewhat enlarged scale; Fig. 3 is a plan view showing the casing in section and Fig. 4 is a detail partly in section and partly in elevation, to be described later.

The same symbols of reference are used to identify the various parts of the apparatus wherever they occur in the drawings.

In the preferred embodiment shown in the drawings my invention is applied to a platform scale of a well known type but its applicability to scales of other types will appear from the following description.

The base 5 of the scale and platform 6 are unmodified by my invention and the former supports by means of pillars 7—7, a casing 8, the side and end walls 9, 10, 11, 12 of which are preferably of glass and the base or floor 13 of metal. The front wall 9 of the casing is preferably pivoted at 14 to provide easy access to the interior. The platform 6 is supported upon the usual levers connected by the usual link 15, yoke 18 and knives 19, to the beam 16 which is pivoted upon the post 20 in the well known manner. The long arm of the beam is provided near its end with a knife 21 from which is suspended by means of the yoke 22 an arm 23 and pan 24 for a purpose which will appear. As shown more particularly in Fig. 4 this pan is hinged at 25 to the arm 23 to facilitate dumping, but the pivot is so arranged that the pan normally maintains the horizontal position shown in Figs. 2 and 4. The beam 16 is provided with the usual adjustable counterbalance 26 and small counterbalance 27 for accurate adjustment. At 28 is shown a poise which may be employed for increasing the capacity of the scale, while at 29 I have provided an extra beam with which a sliding poise 30 coöperates either for the purpose of taking tare or further increasing the capacity of the scale. These described features of counterbalances, sliding poises and tare beams are common in scales of this character and do not enter into my present invention.

Within the casing and parallel to the beam of the scale is arranged a pair of guides 31, 32, which are supported in brackets 33, 34, arranged at opposite ends of the guides, and a carriage or sliding frame 35 consisting of end pieces 36, 37 and connecting rods 38, 38 is arranged to slide upon said guides, the side members of the carriage being perforated at 39, 40 for the reception of the guide rods. The upper ends of the side members project forwardly and carry bearing blocks 41, 42 at their ends and a beam 43 is fulcrumed upon the bearing blocks by means of the knives 44, 45 projecting from opposite sides thereof. Guards 46, 46 extend over the knives and prevent their accidental displacement from the bearing blocks. The beam 43 is arranged to extend at its forward end over the main beam of the platform scale and substantially at its end is provided with a pair of knives 47, 47, the edges of which are uppermost and engage bearing blocks 48, 48 carried at the ends of the transverse bar 49 upon which the pan 50 is supported and hinged. A check bar 51 is rigidly connected to the cross bar 49 by a curved strip 52 which clears the lever end, and to a relatively fixed rod 53 projecting downwardly from a cross bar 54 on the carriage by a check link 55. At its opposite end the beam 43 is provided with an adjustable counterbalance 56 which may be so regulated as to bring the system into equilibrium when there is nothing in the scale pan. The check rod 51 is continued below the check link 55 and is screw threaded at its lower end to receive a yoke 57 in which is mounted an anti-friction roller 63 which is arranged when depressed to rest or travel upon a bar or track 59 carried by the main beam of the scale. Said bar is supported from a pair of brackets 60, 61 upon the main beam and extends parallel thereto, and in juxta-position to this bar or track is a revoluble multiple scale cylinder 62 supported from the brackets 60, 61 by the arms 60', 60'. In the present instance the multiple scale or index carries three distinct sets of graduations one of which runs from zero to 100, another from zero to 1000 and a third from zero to 10,000, though as will be seen later these ranges of graduations may be different if desired; but the multiple scale or index is revolubly mounted in bearings at its ends and may be turned and adjusted to bring any particular one of the series of graduations into reading position and into coöperation with a finger 58 upon the yoke 57, a knurled knob 64 being provided at one end for this purpose. In order to secure delicate reading of the movement of the main scale beam I have provided it with a point 66 which, when the scale is in perfect equilibrium alines with a point 67 upon the stationary bracket 68 upon the frame.

The use of my scale may now be readily understood. The leverage between the platform 6 and the scale pan 24 is such that any weight placed upon the latter will counterbalance a weight one hundred times as great put upon the platform. In other words, the leverage is as 1 to 100. The pan may be used in connection with the platform to tell off articles by the hundreds by putting into the pan a number of the units or single articles equal to the number of hundreds desired, and then adding suitable quantities of the articles to the platform until equilibrium is reëstablished, when the desired number of articles will be found to be upon the platform. It is to be noted that in this operation or in any operation in which no weight is on the scale pan 50 of the traveling scale, the latter in no wise affects the operation of the main scale since it is in equilibrium with the roller held above the track 59 upon the main scale, out of contact therewith.

When it is desired to ascertain the number of equal units in a particular mass in which the entire number of units is less than one hundred, the mass is placed upon the platform 6 and a single unit placed in the pan 50, the revoluble index or graduation cylinder being turned so that the 100 series of graduations is in operative position. The carriage bearing the auxiliary scale with the unit weight in the pan thereof is then adjusted along the beam of the main scale until equilibrium is again established or, in other words, until the weight of the unit, which is transferred by the auxiliary beam through the check bar, roller and track to the main beam, counterbalances the weight of the mass on the platform as shown by the registry of the pointers 66 and 67. By reason of its condition of equilibrium, the weight of the auxiliary scale does not in any manner affect the main beam which is influenced only by the weight of the unit transmitted to it through the check of the auxiliary scale. The leverage of the scale and the graduations of the series on the index cylinder are such that each graduation represents the multiple of any weight applied at the particular point of the graduation on the beam that is to be found in a counterbalancing mass upon the platform. For example, a weight applied at the graduation 5 will counterbalance five times its weight upon the platform and a weight applied at the graduation 10 will counterbalance ten times its weight upon the platform, and so on. Therefore, when the unit weight is put upon the pan of the auxiliary scale and its effect is transferred to the beam, as before stated, and the auxiliary scale moved until the main scale is again in equilibrium, the number on the series of graduations indicated by the finger 63 will indicate the ratio of the weight upon the platform 6 to the weight in the auxiliary scale pan 50 and hence, if the former is composed of a mass of articles identical with that in the scale pan, the number indicated on the series of graduations will be that of the articles on the platform. If, however, the number of articles in the mass is found to be in excess of one hundred, the rotary multiple scale cylinder is adjusted to bring the series of graduations from zero to one thousand into registry with the pointer upon the auxiliary scale. In order to ascertain the correct number of articles upon the platform, using the thousand series of graduation, ten similar articles must be put in the scale pan 50 and the weighing operation carried out as before described. By reason, however, of the multiplication of units and hence of the weight in the scale pan of the auxiliary scale by ten, the balancing or breaking of the scale with the pointer of the auxiliary scale at any particular position upon the main scale beam, indicates a weight on the scale platform ten times as great as if the scale balanced at this point with but a single unit or article in the auxiliary scale pan. Again, if the number of articles on the platform 6 exceeds a thousand, the number of articles in the scale pan 50 to counterbalance the same within the limits of the main beam must be increased beyond 10 and therefore one hundred such articles or ten times the number employed with the one thousand series of graduation is put in the auxiliary scale pan and the ten thousand series of graduation is turned into position for coöperation with the pointer of the auxiliary scale. Equilibrium is established as before by moving the auxiliary scale to a suitable position upon the main scale beam and the correct number of articles can then be read upon the series of graduations.

It will now be obvious that my scale provides means for quickly and accurately ascertaining the number of units of a particular type in a mass which may be employed to advantage in any of the operations above referred to.

I claim:

1. A weighing scale having a beam, a receiver mounted adjacent and adjustable along the beam and adapted to transmit the weight of an article placed thereon to the beam, and means other than the beam for supporting and counterbalancing the receiver.

2. A weighing scale having a beam, a receiver, counterbalance means for supporting said receiver independently of the beam and adjustably movable along the same, the receiver being so related to the beam as to transmit the weight of an article placed thereon to the beam.

3. A weighing scale having a beam, a counterbalanced receiver vertically movable independently of the beam and mounted independently of the beam but adjustably movable along the same and adapted to transmit the weight of an article placed thereon to the beam.

4. A weighing scale having a beam or lever, an auxiliary beam adjustable along said main beam, a receiver on the auxiliary beam, and connections from the auxiliary to the main beam whereby the weight of material placed in the receiver is transmitted to the main beam.

5. A weighing scale having a main beam, an auxiliary beam mounted to travel along the main beam but supported independently thereof, means for counterbalancing the auxiliary beam, a receiver mounted upon the same, and connections from said receiver to the main beam whereby weight placed upon the receiver will be transmitted to the main beam.

6. A weighing scale having a main beam, guides extending parallel thereto, a carriage mounted upon the guides, and a counterbalanced receiver carried thereby, and connections between the receiver and the main beam for transmitting the weight of an article placed in the former to the latter.

7. A weighing scale having a main beam, a guide extending parallel to said beam, a carriage upon said guide and a counterbalanced scale upon said carriage having a part normally extending to a position above the main beam and adapted to be depressed into contact therewith by weight placed in the pan of said auxiliary scale.

8. A weighing scale having a main beam, an auxiliary beam supported independently of and adjustably movable along the main beam and adapted to engage the latter according to its point of adjustment and a load receiver upon the auxiliary beam.

9. A weighing scale comprising a main beam and a counterbalanced auxiliary beam mounted adjacent and arranged to being moved longitudinally of the main beam to engage said main beam at a variable distance from its fulcrum, and a load receiver mounted upon the auxiliary beam.

10. In a weighing scale in combination with the beam thereof, an auxiliary scale adjustable longitudinally of said beam and normally out of engagement therewith, and connections adapted to be depressed into engagement with the beam of the main scale upon addition of weight to the auxiliary scale.

11. A weighing scale comprising a main beam, a guide parallel thereto, an auxiliary scale mounted upon the guide for adjustment along the beam of the main scale, a receiver on the beam of the auxiliary scale located substantially above the beam of the main scale and means depending from said receiver normally held above the beam of the main scale, but adapted to depress the same when weight is added to the receiver.

12. In a weighing scale comprising a main beam, an auxiliary scale adjustable along the main beam and having a receiver overhanging the latter, a check rod depending from the receiver to a point immediately above the main beam and adapted to be depressed into contact therewith and the check plate.

13. A weighing scale having a main beam, a track carried thereby, an auxiliary scale mounted to travel parallel to the main beam and extending over the latter, a receiver and means depending from the receiver into contact with said track.

14. A weighing scale having a main beam, a track carried thereby, an auxiliary scale mounted to travel parallel to the main beam and extending over the latter, a receiver and means depending from the receiver into contact with said track, a graduated member parallel to said track and main beam, and a finger on the auxiliary scale adapted to coöperate with the graduated member.

15. A weighing scale having a main beam, a platform 6 and a scale pan 24 of an auxiliary scale arranged to travel parallel to the main beam and having a goods receiver and means depending from the goods receiver to engage with the main beam and operate the latter.

16. A weighing scale comprising a beam, a platform and a receiver 24 of an auxiliary scale adjustable along the main beam having a scale pan overhanging the latter, means on the auxiliary scale normally suspended above but adapted to engage the main scale beam, a pointer on such means and a graduated scale with which it is adapted to coöperate.

17. A weighing scale comprising a main beam having a point 66 thereon, a stationary point 67 with which said point 66 is adapted to aline, an auxiliary scale adjustable along the main beam and normally counterpoised to hold it out of contact therewith, and means for connecting the auxiliary scale with the main beam when the weight is placed upon the pan of the former.

18. A weighing scale comprising a main beam, a track and a rotary graduation cylinder having a plurality of series of graduations mounted upon said beam, and an auxiliary scale mounted for travel along the beam and having a part adapted to be thrown into contact with the track and a finger coöperating with said graduation cylinder.

19. A weighing scale having a beam, a frame fixed in spaced relation to the beam, a load-receiver, a counterbalanced support for the receiver mounted upon the frame and adjustable longitudinally thereof and arranged to engage the beam at variable distances from its fulcrum to transmit to the beam the weight of an article placed in the load-receiver.

CLARENCE H. HAPGOOD.

Witnesses:
CLARENCE W. FESSENDEN,
M. BALES.